United States Patent

Hiraiwa et al.

[11] 4,257,509
[45] Mar. 24, 1981

[54] HYDRAULIC CLUTCH WITH DUAL PISTONS

[75] Inventors: Kazuyoshi Hiraiwa, Ome; Kotei Takahashi, Tokyo, both of Japan

[73] Assignee: Nissan Motor Company, Limited, Yokohama City, Japan

[21] Appl. No.: 814,090

[22] Filed: Jul. 8, 1977

[30] Foreign Application Priority Data

Jul. 13, 1976 [JP] Japan .................... 51-92320[U]

[51] Int. Cl.² ...................... F16D 25/00; F16D 47/06
[52] U.S. Cl. .................................. 192/86; 192/109 F; 192/109 A; 192/3.33
[58] Field of Search ................ 192/109 F, 109 A, 86, 192/85 AA, 3.33, 3.29, 3.3, 87.17

[56] References Cited

U.S. PATENT DOCUMENTS

| | | | |
|---|---|---|---|
| 2,386,220 | 10/1945 | Lawler et al. ................... | 192/85 AA |
| 3,199,648 | 8/1965 | Schwab ......................... | 192/109 F X |
| 3,384,214 | 5/1968 | Wilson ............................. | 192/109 F |
| 3,422,940 | 1/1969 | Maurice .......................... | 192/3.33 |
| 3,494,450 | 2/1970 | Mankowsky et al. .......... | 192/109 F |
| 4,027,758 | 6/1977 | Moberg et al. ................. | 192/113 B |

FOREIGN PATENT DOCUMENTS 12442 9/1965 Japan ................................. 192/85 AA Primary Examiner—Benjamin W. Wyche
Attorney, Agent, or Firm—Robert E. Burns; Emmanuel J. Lobato; Bruce L. Adams

[57] ABSTRACT

Two cooperatively arranged pistons and a spring interposed therebetween are arranged within the clutch, one of the pistons is formed as a simple and compact annular plate with flat parallel surfaces and the other formed with an annular recess for receiving the plate.

7 Claims, 1 Drawing Figure

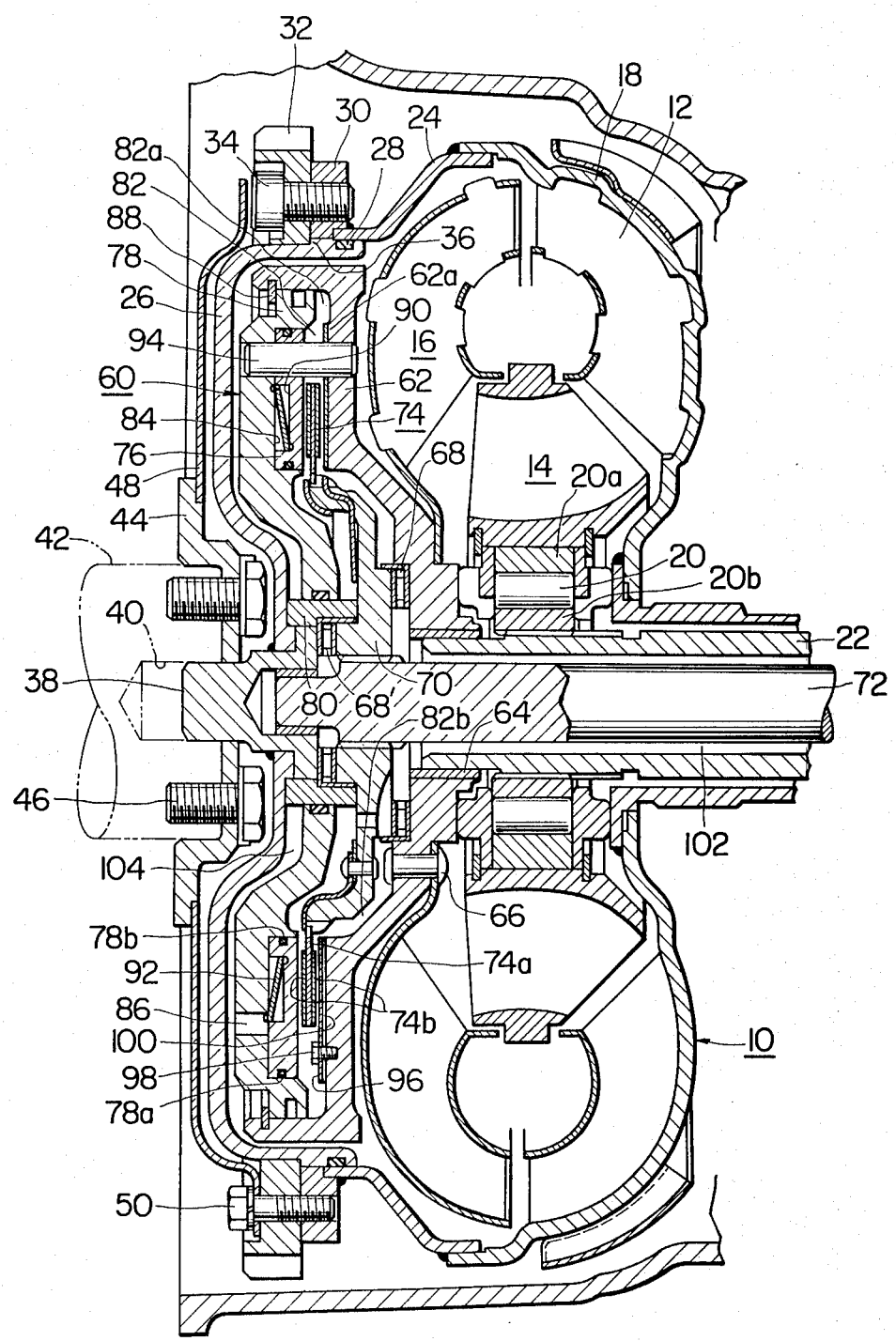

HYDRAULIC CLUTCH WITH DUAL PISTONS

BACKGROUND OF THE INVENTION

The present invention relates in general to clutches in which the friction surfaces work in a hydraulic fluid, for example oil, the control of the engagement of the clutch being hydraulic. More particularly, it relates to a hydraulic clutch of the kind which can be conveniently incorporated with a torque converter or similar fluid coupling of a hydraulically controlled automatic transmission, particularly for an automobile vehicle, and of the kind which includes a set of two pistons and a spring interposed therebetween so that the engagement of the clutch is smooth and reliable.

As is well known, there are two types of hydraulic clutches, one type of which includes a single piston slidably received within a casing constituting a cylinder whereby the engagement of the clutch is obtained when a clutch disc is gripped between the single piston and one end of the casing, and the other type of which includes a set of two pistons cooperatively arranged within a casing and a spring interposed between the two pistons whereby the engagement of the clutch is smooth via the effect of the spring which produces a gradually increasing clutch engagement force. It is known in the art that the hydraulic clutch equipped with cooperatively arranged two pistons and a spring (hereinafter referred to as dual-piston hydraulic clutch for brevity) is superior to the clutch with a single piston with respect to smooth and reliable clutch engagement operation. However, the conventional dual-piston hydraulic clutch has suffered from the drawback that its pistons both have very complicated shapes and large dimensions which reduce productivity and thus make same expensive.

SUMMARY OF THE INVENTION

It is accordingly an object of the present invention to provide a dual-piston hydraulic clutch in which the conventional drawback mentioned-above is overcomed while improving its clutch engagement operation.

For achieving the foregoing object, as well as others which are to become clear from the description hereinbelow, there is provided according to the present invention a hydraulic clutch comprising a driving bell-casing rotatable about an axis and constituting a hydraulic cylinder, a set of first and second pistons coupled in piston/cylinder relationship with said bell-casing for thereby defining a clutch chamber of a variable volume containing working fluid, the set of first and second pistons being non-rotatable with respect to said bell-casing, a driven clutch disc axially movable along said axis within said clutch chamber and so arranged between the set of first and second pistons and one end of said bell-casing as to be gripped therebetween by movement of the set of first and second pistons toward that end, and a spring interposed between said first and second pistons for biasing said first piston away from said second piston in a opposite direction generally parallel to said axis, in which said first piston is an annular parallel-plane plate of which one side surface is contactable with the corresponding surface of said clutch disc when said first piston is moved toward that end, said second piston is formed with an annular recess constituting a hydraulic cylinder at the side facing said first piston for receiving in piston/cylinder relationship said first piston, and said spring has one end resting on the bottom of said annular recess and the other end engaging with said first piston.

Other objects and features of the present invention will become apparent from the following description given by way of example with reference to the accompanying single drawing.

BRIEF DESCRIPTION OF THE DRAWING

The only FIGURE shows a longitudinal cross-sectional view of a portion of a hydraulic transmission incorporating a dual-piston hydraulic clutch according to the present invention.

DESCRIPTION OF THE PREFERRED EMBODIMENT

Referring to the embodiment shown in the drawing, which is an application of the invention to the hydraulic transmission of an automobile vehicle, the drawing shows generally denoted by reference character 10 a torque converter, by 12 the impeller of the converter, by 14 the stator of the convertor, by 16 the turbine of the converter, and by 18 the impeller shell part or portion of the converter, to which the impeller 12 is rigidly connected. The stator 14 is coupled to the outer race 20a of a unidirectional coupling 20, by which the stator 14 is prevented from turning in the sense opposite to the rotation of the engine of the automobile vehicle (not shown).

The inner periphery of the impeller shell part 18 is secured by welding to the periphery of an extension shell part 24 which is in turn sealingly carried around the periphery of a first bell shaped member or bell 26, as it will be simply referred to hereafter, through a fluid seal 28 interposed therebetween and fixed to the bell 26 in a manner as will be apparent from the description hereinbelow.

The extension shell part 24 is rigidly secured by welding to a radially extending flange member 30 which is coupled with a ring gear 32 by means of bolts 34. The bell 26 is formed with a peripheral shoulder 36 which abuts against the inner end portion of the ring gear 32 when carried on the bell 26 and coupled to the flange member 30 whereby the relative movement between the extension shell part 24 and the bell 26 is prevented in the direction of being apart from each other.

The bell 26 is welded at its central portion to a pilot element 38 which is in turn received within a corresponding recess 40 in the adjacent end of an engine output shaft or an input shaft 42 of the converter 10. The input shaft 42 is coupled through a rigid plate 44 and by means of bolts 46 with a flexible plate 48 which is in turn secured to the ring gear 32 by means of bolts 50 whereby the input shaft 42 is drivably connected to the impeller 12 of the converter 10.

The reference character 60 generally designates a dual-piston hydraulic clutch according to the present invention which comprises a second bell shaped member or bell casing 62, as it will be referred to hereafter, which constitutes a hydraulic cylinder. The bell-casing is rotatable about an axis and in this embodiment is rotatably mounted on the stationary sleeve 22 through a suitable bearing such as a journal 64 as shown, and is secured to the turbine 16 of the converter 10 by means of rivets 66.

With the bell-casing 62 coupled in piston/cylinder relationship are two pistons 76 and 78, i.e., the set of two pistons, as they will be referred to hereafter, are axially movable along the axis of the input shaft 42 within the bell-casing 62. For the purpose of clarity, the piston 76 will be referred to as a first piston and the piston 78 as a second piston.

As shown in the drawing, the second piston 78 sealingly and slidably engages at its periphery the perpheral cylindrical portion of the bell-casing and is provided with a central opening which sealingly and movably engages an adaptor ring 80 mounted on the pilot element 38 whereby a fluid tight clutch chamber 82 of a variable volume containing working fluid such as oil, is defined.

Within the clutch chamber 82, a clutch disc 74 is arranged so as to be axially movable along the axis of rotation of the bell-casing 62 and positioned between the set of first and second pistons 76 and 78 and one end 62a of the bell-casing 62 to be gripped therebetween by movement of the set of first and second pistons toward said end 62a. In this embodiment, the clutch disc 74 is splined to the clutch hub 70 and is composed of an annular plate 74a and annular friction linings 74b provided on both sides of the plate 74a. The clutch hub 70 is arranged to be axially stationary via a pair of thrust bearings 68 and 68' between the bell-casing 62 and the pilot element 38 and is splined to a driven shaft or an output shaft 72 of the converter 10 for rotation therewith.

According to the present invention, the first piston 76 is formed as an annular plate which has exactly parallel and flat surfaces and which will be reffered to hereafter as an annular parallel-plane plate, one side surface of which is contactable with the corresponding surface of said clutch disc 74 when the first piston 76 is moved toward said end 62a. The second piston 78 is formed with an annular recess 84 constituting a cylinder and corresponding in shape to the annular parallel-plane plate 76 at the side facing the first piston 76. The first piston 76 is thus received in piston/cylinder relationship within the annular recess 84. For assuring the piston/cylinder relationship between the first and second pistons 76 and 78, the inner and outer peripheral surfaces of the first piston 76 are sealed to be fluid tight against the corresponding surfaces of the annular recess 84 by means of fluid seals 78a and 78b. The first piston 76 is thus sealingly movable relative to the second piston 78 and cooperative with one end 62a of the bell-casing 62 for clamping or releasing the clutch disc 74. The annular recess 84 is fluidly communicated with the torque converter 10 through a through-opening 86 formed in the second piston 78 to extend axially thereof so that any undesirable pressure may not be produced which interrupts the relative movement between the first and second pistons 76 and 78.

Preferably, the depth of the annular recess 84 is generally equal to the thickness of the first piston 76 as shown in the drawing.

The axial movement of the second piston 78 in the leftward direction in the drawing is limited by a snap ring 88 fixed in the peripheral cylindrical portion of the bell-casing 62. According to the present invention, the first piston 76 is preferably formed with an annular recess 90 in the side facing the second piston 78, which recess 90 receives therein a spring, such as a cup spring 92 as shown, operable to biase the first piston away from the second piston. Such an annular recess 90 is quite advantageous for a compact axial size of the hydraulic clutch 60.

The first and second pistons 76 and 78 are non-rotatable with respect to the driving bell-casing 62 so that the driving torque of the bell-casing is optimally transmitted to the driven clutch disc 74. For this end, a guide pin 94 is provided which has one end fixedly secured to the bell-casing 62 and the other end extending into corresponding openings formed in the first and second pistons whereby the relative movement between the set of first and second pistons and the bell-casing is prevented while allowing the relative axial movement therebetween. The location of the guide pin 94 is selected so as to be as close as possible to the periphery of the bell-casing 62 so that the clutch disc 74 and consequently the friction linings thereof may have the widest possible operating surfaces which advantageously increase the torque transmission capacity of the hydraulic clutch.

According to the present invention, the hydraulic clutch further comprises means for providing communication between the peripheral portion 82a of the clutch chamber 82 and the central portion 82b of same so that the central and peripheral portions 82b and 82a are not isolated when the clutch disc 74 is gripped between the set of first and second pistons and one end 62a of the bell-casing 62.

As shown in the drawing, the means comprises at least one diametral groove 100 formed in the bell-casing 62 at one end 62a thereof, which groove has one end open to the peripheral portion 82a of the clutch chamber and the other end open to the central portion 82b of same. An annular flat plate 96 is secured to the end 62a by means of bolts 98 for convering the groove 100 and provides with the bell-casing an optimal friction surface which contacts the clutch disc 74 upon engagement of the clutch.

Such a radially extending groove or diametral groove 100 is quite advantageous for the smooth engagement of the hydraulic clutch by eliminating such counter force that obstructs the movement of the set of first and second pistons toward the engagement of the clutch because in case of the absence of such a groove 100 the working fluid in the peripheral portion 82a of the clutch chamber 82 would be trapped by the closure of the clutch and consequently above-mentioned counter force is produced by the enclosed working fluid. According to the present invention, the peripheral portion 82a of the clutch chamber 82 is fluidly vented through the diamentral groove 100 to the central portion 82b which is further vented through an annular passage 102 to a conventional hydraulic control system (not shown in the drawing) upon engagement of the clutch.

Although the cup spring 92 is disposed between the first and second pistons for driving them in the opposite directions, such can be replaced without difficulty by at least one coil spring for achieving the same effect. In case of employing a coil spring in place of the cup spring 92, however the shape of recess 90 must be formed correspondingly.

As appreciated from the above description, the provision of the recess 90 in the first piston 76 is not essential for the hydraulic clutch according to the present invention and without such recess the same effect can be achieved. However, such provision of the recess 90 is preferable for the compact size of the clutch as mentioned before.

Operation of the above-mentioned dual-piston hydraulic clutch according to the present invention will be explained hereinafter.

To engage the clutch, a preponderant pressure is developed in a control chamber or space 104 surrounding the hydraulic clutch in a selective manner by means of a fluid distribution means or a hydraulic control system of the kind well known in the art, and simultaneously the pressure of the working fluid present in the clutch chamber 82 is released to the conventional hydraulic control system. As a result, the biasing force produced by the cup spring 92 prevails over the force applied to the first piston 76 by the working fluid in the clutch chamber 82, followed by the movement of the first piston toward its remotest position with respect to the second piston 78. Then the first and second pistons move axially to the right as seen in the drawing, i.e. toward engagement of the clutch activated by the force derived from the pressure differential between the space 104 and the clutch chamber 82. The first piston 76 first reaches the position at which it abuts against one end 62a of the bell-casing 62 via the clutch disc 74 where it is prevented from further moving. Subsequently, the second piston 78 continues to be displaced axially to the right while compressing the cup spring 92. The compression of the cup spring 92 provides a gradual increase in the gripping force between the first piston 76 and the bell-casing 62 whereby a gradual and therefore smooth engagement of the clutch takes place.

The clutch engagement operation is completed when the second piston 78 contacts the first piston 76 fully compressing the cup spring 92 whereby a preponderant force acting on the second piston toward engagement of the clutch is transmitted to the clutch disc 74 directly through the first piston and consequently the clutch engagement force is maximised.

To disengage the clutch, a preponderant pressure is on the contrary developed in the clutch chamber 82 in a known manner by means of the conventional hydraulic control system (not shown) and the pressure in the space 104 surrounding the first and second pistons and the bell-casing is released. In response to such a controlled variation of the pressure differential of the working fluid between the space 104 and the clutch chamber 82, the first and second pistons 76 and 78 are actuated to move toward their positions shown in the drawing through disengagement operation steps which occur in just reverse order relative to the engagement operation. The disengagement operation of the clutch is completed when the second piston 78 abuts against the snap ring 88 at which the further axial movement of the second piston is prevented and subsequently the first piston 76 abuts against the second piston 78 with the cup spring 92 fully compressed therebetween as shown in the drawing.

From the foregoing description, it will be appreciated that the dual-piston hydraulic clutch according to the present invention is optimally constructed for making it possible to construct the first piston 76 in the form of a simple and compact parallel-plane plate, which provides considerable advantage in that it is possible to reduce its cost particularly during fabrication while increasing its accuracy because due to such simple and compact shape of the first piston, for example, a plural number of first pistons can be ground at one time by a single grinding machine.

It will be further appreciated that the clutch engagement operation of the hydraulic clutch according to the present invention is optimally improved due to, for example, means for providing communication between the central and peripheral portions of the clutch chamber wherein the annular plate 96 provides optimal friction surface with the bell-casing.

What is claimed is:

1. In a hydraulic clutch including: a driving bell-casing rotatable about an axis and constituting a cylinder; a set of first and second pistons coupled in a piston/cylinder relationship with said bell-casing to define a clutch chamber of a variable volume containing a working fluid; a driven clutch disc axially movable along said axis within said clutch chamber and arranged between the set of first and second pistons and one end of said bell-casing so as to be gripped therebetween by movement of the set of first and second pistons toward that end, the movement of the set of first and second pistons toward and away from that end being selectively controlled by the pressure difference of working fluid between inside and outside of said clutch chamber; and a spring interposed between said first and second pistons to urge said first piston away from said second piston generally parallelly to said axis; the improvement comprising:
   a guide pin fixed to said bell-casing and mounted in said first and second pistons for providing alignment between said first and second pistons and said bell-casing and preventing the rotation of said first and second pistons relative to said bell-casing;
   said first piston constituting an annular parallel-plane plate having parallel, flat contoured side surfaces one of which are contactable with the corresponding surface of said clutch disc when said first piston is moved toward that end;
   said second piston having an annular recess corresponding in shape to said first piston, said annular recess constituting a cylinder and receiving in piston/cylinder relationship said first piston; and
   said spring having one end resting on the bottom of said annular recess and the other end engaging said first piston.

2. The improvement in a hydraulic clutch as claimed in claim 1, in which said first piston has a recess at the axial side facing said second piston for thereby receiving said spring.

3. The improvement in a hydraulic clutch as claimed in claim 1, in which said spring is a cup spring.

4. The improvement in a hydraulic clutch as claimed in claim 1, further comprising means for providing communication between the central portion of said clutch chamber and the peripheral portion of same so that said portions are prevented from being isolated when the clutch disc is gripped between the set of first and second pistons and said one end of said bell-casing.

5. The improvement in a hydraulic clutch as claimed in claim 4, in which said means comprises at least one diametral groove formed in said bell-casing at said end thereof, the diametral groove having one end open to the peripheral portion of the chamber and the other end open to the central portion of same, and an annular flat plate covering said diametral groove and fixedly secured to said end of said bell-casing.

6. The improvement in a hydraulic clutch as claimed in claim 1, in which said second piston has a through-opening extending axially thereof, one end of the through opening is open to said annular recess formed in said second piston.

7. In a hydraulic clutch including: a fluid chamber filled with working fluid; a driving bell-casing disposed in said fluid chamber, rotatable about an axis and constituting a cylinder; a set of first and second pistons coupled in piston/cylinder relationship with said bell-casing to divide said fluid chamber into a clutch chamber and a control chamber which are located inside and outside said bell-casing, respectively, the set of first and second pistons being responsive to the pressure difference of working fluid between said clutch chamber and said control chamber; a driven clutch disc axially movable along said axis within said clutch chamber and arranged between the set of first and second pistons and one end of said bell-casing so as to be gripped therebetween by movement of the set of first and second pistons toward that end; a spring interposed between said first and second pistons to urge said first piston away from said second piston generally parallel to said axis; a source of fluid under pressure; and a fluid distribution means selectively operative to communicate said control chamber with the source of fluid under pressure while draining said clutch chamber when the clutch is to be engaged and to communicate said clutch chamber with the source of fluid under pressure while draining said control chamber when the clutch is to be disengaged; the improvement comprising:

a guide pin fixed to said bell-casing and mounted in said first and second pistons for providing alignment between said first and second pistons and said bell-casing and preventing the rotation of said first and second pistons relative to said bell-casing;

said first piston being an annular parallel-plane plate having parallel, flat contoured side surfaces one of which is contactable with a corresponding surface of said clutch disc when said first piston is moved toward that end;

said second piston having an annular recess corresponding in shape to said first piston, said annular recess constituting a cylinder and receiving in piston/cylinder relationship said first piston; and said spring having one end resting on the bottom of said annular recess and the other end engaging said first piston and constructed to allow said first piston to retain, during disengagement of the clutch, an operative position where said first piston abuts against the bottom of said annular recess being urged by the fluid pressure in said clutch chamber and overcoming the force of said spring.

* * * * *